United States Patent
Doherty et al.

(10) Patent No.: US 7,561,682 B2
(45) Date of Patent: Jul. 14, 2009

(54) METHOD AND APPARATUS FOR AN INTEGRATED CALL LOG AND PROTOCOL MAPPING

(75) Inventors: James M. Doherty, Georgetown, TX (US); Larry B. Pearson, San Antonio, TX (US)

(73) Assignee: AT&T Intellectual Property I.L.P., Reno, NV (US)

( * ) Notice: Subject to any disclaimer, the term of this patent is extended or adjusted under 35 U.S.C. 154(b) by 898 days.

(21) Appl. No.: 10/947,960

(22) Filed: Sep. 23, 2004

(65) Prior Publication Data

US 2006/0062205 A1    Mar. 23, 2006

(51) Int. Cl.
*H04M 7/00* (2006.01)
(52) U.S. Cl. .................. 379/221.09; 379/126; 370/352
(58) Field of Classification Search ............... 379/201.1
See application file for complete search history.

(56) References Cited

U.S. PATENT DOCUMENTS

| | | | |
|---|---|---|---|
| 6,282,275 B1 | 8/2001 | Gurbani et al. | |
| 6,891,940 B1 * | 5/2005 | Bhandari et al. | 379/142.06 |
| 6,904,137 B2 * | 6/2005 | Brandt et al. | 379/126 |
| 2002/0003793 A1 | 1/2002 | Poppe et al. | |
| 2003/0026413 A1 | 2/2003 | Brandt et al. | |
| 2004/0136509 A1 | 7/2004 | Reynolds | |
| 2007/0064911 A1 * | 3/2007 | Bedingfield et al. | 379/221.09 |

* cited by examiner

*Primary Examiner*—Creighton Smith
(74) *Attorney, Agent, or Firm*—Jackson Walker L.L.P.

(57) ABSTRACT

The invention provides a system and a method display incoming and outgoing call log data associated with telephone calls to and from a plurality of subscriber telephone numbers from one or more telephone networks. The system includes a switch in one network that receives a telephone call from the subscriber's telephone and launches a query in response to an AIN trigger to a service control point. In response, the service control point forwards associated call data to a call log gateway that translates the message into an asynchronous message containing call log data. The call log gateway forwards the asynchronous message to a unified communication platform where it is placed in subscriber mailbox and made available as a call log to a subscriber via a graphic user interface over the internet. A web server retrieves the call log and displays it to the subscriber at a web client.

53 Claims, 14 Drawing Sheets

Inbound call log mapping InvokeApp()

| | InvokeApp Element Identifier Parameter # | EMAIL Field | Value | Description |
|---|---|---|---|---|
| 601 | 1 | From | -CNAM | If available Should be inserted. Canonical Name |
| 603 | 2 | From | <calling-telephone-number> | The calling telephone number. |
| 605 | 3 | From | @CLG-FQDN | |
| 607 | 4 | Reply-To | <call-log-postmaster> | To be chosen by SBC Messaging Operations Staff. Or Operations staff of vendor subscribing to the STMP call log service. |
| 609 | 5 | Reply-To | @MMTA-FQDN | Fully Qualified Domain Name MMTA is the DCL modified |
| 611 | 6 | To | <called-telephone-number> | Dialed Number |
| 613 | 7 | To | @MMTA-FDQN | CL gateway fully qualified domain name |
| 615 | 8 | EMAIL MESSAGE BODY | Mm/dd/yyyy HH:MM:SS (AM/PM) | DATE/TIME |

*FIG. 8*

Outbound call mapping InvokeApp()

| | InvokeApp Parameter # | EMAIL Field | Value | Description |
|---|---|---|---|---|
| 701 | 1 | From | <calling-telephone-number> | Called From Number |
| 703 | 2 | From | @CLG-FQDN | Fully Qualified Domain Name. |
| 705 | 3 | Reply-To | <call-log-postmaster> | This is the UserID that reply messages are sent to |
| 707 | 4 | Reply-To | @MMTA-FQDN | Domain of Enhanced Service Provider |
| 709 | 5 | To | <called –telephone-number> | Calling Number |
| 711 | 6 | To | @MMTA-FDQN | Calling Number Modified MTA |
| 713 | 7 | Subject | <called-telephone number> | Dialed Number |
| 715 | 8 | EMAIL BODY | Mm/dd/yyyy HH:MM:SS | DATE/TIME: |

Outbound Call Log Mapping InvokeApp()

Inbound Call Log Email Message Header Values

| Requirements Inbound Call Log Email Message Header Values | |
|---|---|
| Field | Associated Data Value |
| From | "-CNAM"<calling-telephone-number@CLG-FQDN> |
| Reply-To | <call-log-postmaster@MMTA-FQDN> |
| To | <called-telephone-number@MMTA-FQDN> |
| Subject | Inbound Call To called-telephone-number From-CNAM, calling-telephone-number |

FIG. 11

Inbound Call Log Email Message Header Variables

| Requirements Inbound Call Log Email Message Header Variables | |
|---|---|
| Variable | Description |
| CNAM | The telephone network CNAM which is the name displayed on Caller ID devices that displayed calling name and calling number information. This value will be the value if the calling number is known and the call is not marked PRIVATE. When the calling information is not known, this value is replaced with "UNKNOWN NAME." If the calling information is marked PRIVATE, this value is replaced with "PRIVATE NAME." |
| calling-telephone-number | The ten digit telephone number of the caller if known and presentable. If the call is marked PRIVATE, the telephone number is replaced with "PRIVATE NUMBER". If the calling information is UNKNOWN, the number is replaced with "UNKNOWN NUMBER". The telephone number format (assuming NANP) is "999-999-9999". |
| CLG-FQDN | Calling Log Gateway Fully Qualified Domain Name- This is the public internet domain name of the calling log gateway. Each calling log gateway instance is assumed to have its own fully qualified domain name. |
| call-log-postmaster | This is the user ID that reply messages to call log record email messages are sent. We assume that we don't want these messages directed back to the telephone network systems. The way UC+ is being setup, the end-user won't be able to reply to call log messages. However, other Enhanced Service Providers (ESP) may not have the same view. We want any reply messages directed back to the ESP. |
| MMTA-FQDN | Modified Message Transfer Agent Fully Qualified Domain Name- This is the public internet domain name used for sending call logs to. In the case of UC+, the choice of domain name will be made by SBC Messaging Operations staff. |
| called-telephone-number | This is the number dialed and presumably it is the one with the network call log support provisioned. UC+ uses this number to find the correct mailbox for the call log message. The telephone number format is "999-999-9999". |

FIG. 12

Inbound Call Log Email Message Body

| Requirements Inbound Call Log Email Message Body | |
|---|---|
| Line | Value |
| 1 | CALL FROM: calling-telephone-number, -CNAM |
| 2 | CALL TO: called-telephone-number |
| 3 | DATE/TIME: mm/dd/yyyy HH:MM:SS AM/PM |

1201 — line 1
1203 — line 2
1205 — line 3

FIG. 13

Inbound Call Log Email Message Body Variables

| Requirements Inbound Call Log Email Message Body Variables | |
|---|---|
| Variable | Description |
| CNAM | The telephone network CNAM which is the name displayed on Caller ID devices that displayed calling name and calling number information. This value will be the value if the calling number is known and the call is not marked PRIVATE. When the calling information is not known, this value is replaced with "UNKNOWN NAME." If the calling information is marked PRIVATE, this value is replaced with "PRIVATE NAME." |
| calling-telephone-number | The ten digit telephone number of the caller if known and presentable. If the call is marked PRIVATE, the telephone number is replaced with "PRIVATE NUMBER". If the calling information is UNKNOWN, the number is replaced with "UNKNOWN NUMBER". The telephone number format (assuming NANP) is "999-999-9999". |
| called-telephone-number | This is the number dialed and presumably it is the one with the network call log support provisioned. The telephone number format is "999-999-9999". |
| Month mm | Month in two digit format where January is "01". |
| Day dd | Day of month in two digit format where the first day of the month is "01". |
| Year yyyy | Year where the year is in four digit format and this year is "2004". |
| Hour HH | Hour of the day using a 12 hour clock 1 :00 AM is represented as "01" and 1:00 PM is represented as "01". |
| Miniute MM | Minute of the hour in two digit format. |
| Second SS | Second of the minute in two digit format. |
| AM OR PM A | "A" or "P" depending on if this time is AM or PM. |

1301 — CNAM
1303 — calling-telephone-number
1305 — called-telephone-number
1307 — Month mm
1309 — Day dd
1311 — Year yyyy
1313 — Hour HH
1315 — Miniute MM
1317 — Second SS
1319 — AM OR PM A

FIG. 14
Outbound Call Log Email Message Header Values

| Requirements Outbound Call Log Email Message Header Values | |
|---|---|
| Field | Associated Data Value |
| From | <calling-telephone-number@CLG-FQDN> |
| Reply-To | <call-log-postmaster@MMTA-FQDN> |
| To | <calling-telephone-number@MMTA-FQDN> |
| Subject | Outbound Call From calling-telephone-number To called-telephone-number |

- 1401 From
- 1403 Reply-To
- 1405 To
- 1407 Subject

FIG. 15
Outbound Call Log Email Message Header Variables

| Requirements Outbound Call Log Email Message Header Variables | |
|---|---|
| Variable | Description |
| calling-telephone-number | The ten digit number of the caller who also subscribers to the UC+ service. This number is used by UC+ to find the correct mailbox. Format is "999-999-9999". |
| CLG-FQDN | Calling Log Gateway Fully Qualified Domain Name- This is the public internet domain name of the calling log gateway. Each calling log gateway instance is assumed to have its own fully qualified domain name. |
| call-log-postmaster | This is the user ID that reply messages to call log record email messages are sent. We assume that we don't want these messages directed back to the telephone network systems. The way UC+ is being setup, the end-user won't be able to reply to call log messages. However, other Enhanced Service Providers (ESP) may not have the same view. We want any reply messages directed back to the ESP. |
| MMTA-FQDN | Modified Message Transfer Agent Fully Qualified Domain Name- This is the public internet domain name used for sending call logs to. In the case of UC+, the choice of domain name will be made by SBC Messaging Operations staff. |
| called-telephone-number | This is the number dialed and end-user from the calling-telephone number. When this is a NANP type telephone number the format is "999-999-9999" otherwise the digits dialed (international call) are displayed without any dashes. |

- 1501 calling-telephone-number
- 1503 CLG-FQDN
- 1505 call-log-postmaster
- 1507 MMTA-FQDN
- 1509 called-telephone-number

FIG. 16

Outbound Call Log Email Message Body

| | Requirements<br>Outbound Call Log Email Message Body | |
|---|---|---|
| 1601 | Line | Value |
| 1603 | 1 | CALL TO: called-telephone-number |
| 1605 | 2 | CALL FROM: calling-telephone-number |
| 1607 | 3 | DATE/TIME: mm/dd/yyyy HH:MM:SS AM/PM |

FIG. 17

| | | |
|---|---|---|
| 1701 | calling-telephone-number | The ten digit telephone number of the subscriber in "999-999-9999" format. |
| 1703 | called-telephone-number | This is the number dialed by the subscriber. When this is a North American Numbering Plan (NANP) type telephone number it is represented as "999-999-9999", otherwise it will be whatever digits were dialed for the international call. |
| 1705 | Month mm | Month in two digit format where January is "01". |
| 1707 | Day dd | Day of month in two digit format where the first day of the month is "01". |
| 1709 | Year yyyy | Year where the year is in four digit format and this year is "2004". |
| 1711 | Hour HH | Hour of the day using a 12 hour clock 1 :00 AM is represented as "01" and 1:00 PM is represented as "01". |
| 1713 | Miniute MM | Minute of the hour in two digit format. |
| 1715 | Second SS | Second of the minute in two digit format. |
| 1717 | AM OR PM A | "A" or "P" depending on if this time is AM or PM. |

# METHOD AND APPARATUS FOR AN INTEGRATED CALL LOG AND PROTOCOL MAPPING

BACKGROUND OF THE INVENTION

1. Field of the Invention

The present invention relates to the field of telecommunications. More particularly, the present invention relates to telephone call log data accessible by a subscriber.

2. Background Information

The written description provided herein contains acronyms which refer to various telecommunications services, components and techniques, as well as features relating to the present invention. Although some of these acronyms are known, use of these acronyms is not strictly standardized in the art. For purposes of the written description herein, the acronyms are defined as follows:

Advanced Intelligent Network (AIN)
    Graphical User Interface (GUI)
    Generic Data Interface (GDI)
    HyperText Mark-Up Language (HTML)
    HyperText Transfer Language Protocol (HTTP)
    Lightweight Directory Access Protocol (LDAP)
    Off-Hook Delay (OHD)
    Call Log (CL)
    Personal Call Manager/Personal Communications Manager (PCM)
    Public Switched Telephone Network (PSTN)
    Service Control Point (SCP)
    Service Switching Point (SSP)
    Signaling System 7 (SS7)
    Signaling Transfer Point (STP)
    Transmission Control Protocol/Internet Protocol (TCP/IP)
    Background Information Presently, a number of advanced intelligent network (AIN) and Voice over Internet Protocol (VOIP) based telephone systems enable dynamic interaction between their customers and their respective service accounts. Servers, databases, intelligent peripherals and other external data network elements interface with the public switched telephone network (PSTN) to process and store information created during routine handling of telephone calls. For example, names may be associated with incoming calling party numbers using an external directory database while the PSTN is processing the call. The name, telephone number and other call specific information may then be stored in an external database for access by the customer.

For example, an outgoing call logging database is described in Brandt et al. U.S. Patent Publication 2003/0026413 entitled System and Method for Creating and Accessing Outgoing Telephone Call Log. Brandt et al. describes a system for providing an outgoing call log on an external database. Brandt describes a system and a method to store, display and report outgoing call log data in an external data base associated with outgoing telephone calls from a subscriber's telephone. The Brandt system includes a switch in one network that receives a telephone call from the subscriber's telephone and launches a query in response to an AIN trigger to a service control point (SCP). In response, the SCP forwards associated call data to an interface server in another network via a generic data interface. The interface server obtains additional information from a directory database and sends the call data and the additional information to an external outgoing call log database, which stores the call data and the additional information as the outgoing call log data. A web server retrieves the outgoing call log data and displays it to the subscriber at a web client.

SUMMARY OF THE INVENTION

The present invention provides access to an aggregation of call log information for multiple telephone networks and multiple telephone numbers for a subscriber at a single site. The present invention provides an asynchronous communication protocol for sending call log data to a subscriber's mailbox over the Internet. The present invention enables the integration in Internet space of a call log for incoming and outgoing calls for multiple telephone systems and multiple telephone numbers including wireless and wire line PSTN and VOIP telephone systems, and makes the integrated log available to a customer at a single site in Internet space. The present invention provides a simple method and apparatus for extracting call log information from a telephone system and placing it in Internet space without impacting performance of the underlying telephone system. Thus, in one aspect, the invention provides a call log for all incoming and outgoing calls associated with a subscriber telephone line. In another aspect, the invention provides a call log integrated for a plurality of telephone systems including PSTN and VOIP telephone system platforms. In another aspect, the invention provides an aggregate call log for all of a subscriber's telephone numbers as they appear in a customer profile or a customer account in a data base and an integrated call log accessible to a subscriber graphic user interface (GUI) in Internet space. It is another object of the invention to provide simple communication of asynchronous integrated call log data to a subscriber. It is another object of the invention to provide a Call Log Message Transfer Agent for translating TCAP messages from an underlying telephone system into SMTP call log messages. The SMTP messages are sent to a unified communication (UC) platform for entry of call log data at a subscriber's mailbox. It is another object of the invention to provide a mapping between TCAP messages and SMTP messages for communication between a plurality of telephone systems and a common call log site. These and other objects of the invention will be described in the following description and figures.

Examples of certain features of the invention have been summarized here rather broadly in order that the detailed description thereof that follows may be better understood and in order that the contributions they represent to the art may be appreciated. There are, of course, additional features of the invention that will be described hereinafter and which will form the subject of the claims appended hereto.

BRIEF DESCRIPTION OF THE DRAWINGS

For detailed understanding of the present invention, references should be made to the following detailed description of an exemplary embodiment, taken in conjunction with the accompanying drawings, in which like elements have been given like numerals.

FIG. 8 is a mapping of Inbound Call Log Mapping InvokeApp parameters to SMTP email fields, according to an aspect of the present invention;

FIG. 9 is a mapping of an Outbound Call Log Mapping InvokeApp parameters to SMTP email fields, according to an aspect of the present invention;

FIG. 10 illustrates Inbound Call Log Email Message Header Values according to an aspect of the present invention;

FIG. 11 illustrates Inbound Call Log Email Header Variables according to an aspect of the present invention;

FIG. 12 illustrates an Inbound Call Log Email Message Body according to an aspect of the present invention;

FIG. 13 illustrates Inbound Call Log Email Message Body Variables according to an aspect of the present invention;

FIG. 14 illustrates Outbound Call Log Email Header Values according to an aspect of the present invention;

FIG. 15 illustrates Outbound Call Log Email Header Variables according to an aspect of the present invention;

FIG. 16 illustrates Outbound Call Log Email Message Body according to an aspect of the present invention;

FIG. 17 illustrates Outbound Call Log Email Message Body Variables according to an aspect of the present invention.

DETAILED DESCRIPTION OF THE PREFERRED EMBODIMENTS

In view of the above, the present invention through one or more of its various aspects and/or embodiments is presented to accomplish one or more objectives and advantages, such as those noted below.

One aspect of the invention provides a call log for all incoming and outgoing calls associated with a subscriber telephone line. In another aspect of the present invention an integrated call log for a plurality of underlying telephone systems including PSTNs, VOIP platforms and wireless networks is provided. In another aspect of the present invention an integrated call log is provided in Internet space for all incoming and outgoing calls for a plurality of phones and telephone numbers associated with a subscriber. In another aspect of the present invention simple asynchronous communication of call log data to a UC subscriber is provided. In another aspect of the present invention a CL MTA (Call Log Gateway) for translating TCAP messages to SMTP call log messages for entry of call log data at a common site is provided. In another aspect of the present invention a mapping between TCAP messages and SMTP messages for communication between a plurality of telephone systems and a common call log site is provided.

Figure 1:
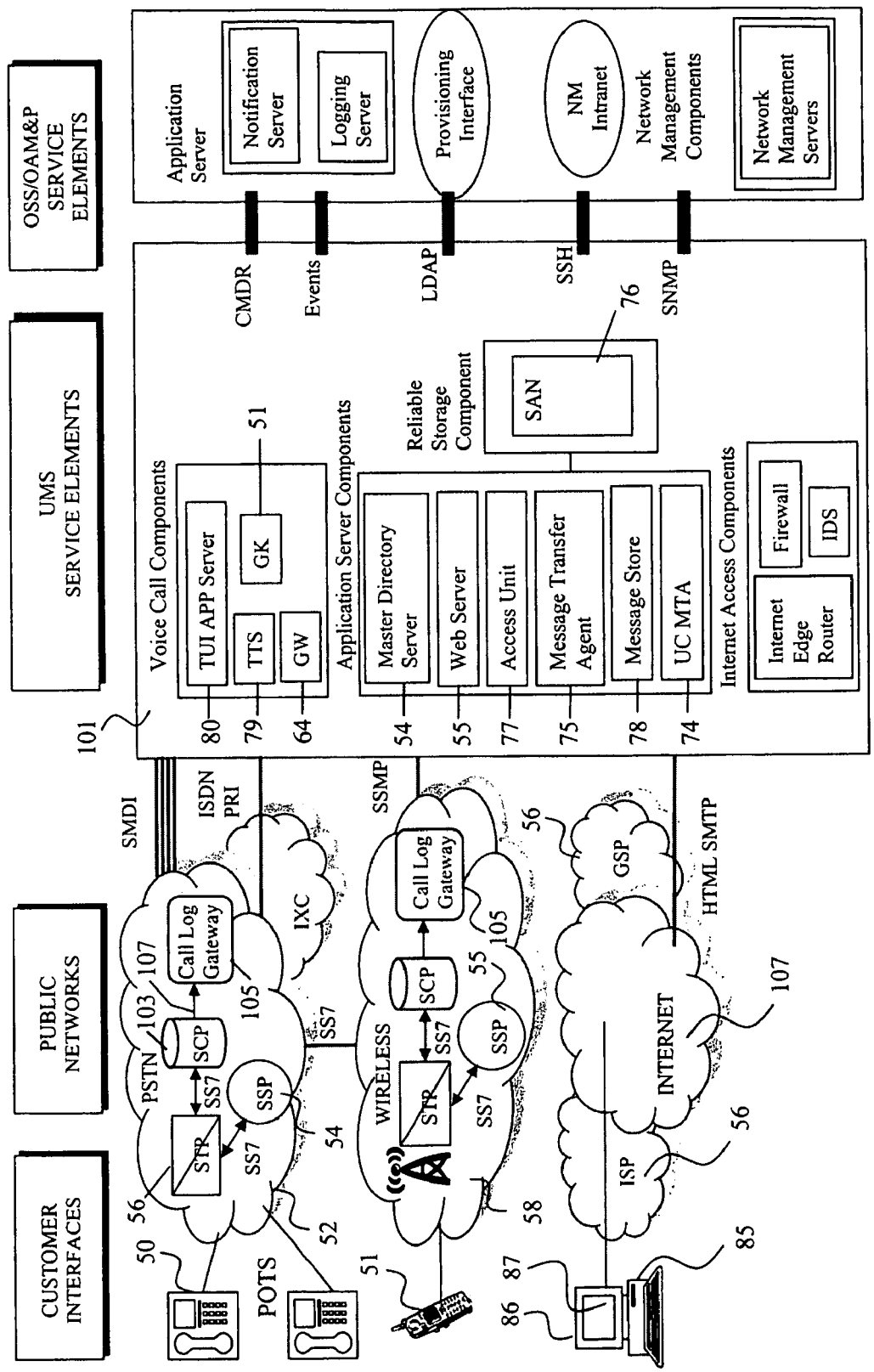
FIG. 1 is a diagram of a Wireline/Wireless Call Log Support Network architecture, according to an aspect of the present invention.

FIG. 1 is a diagram of a Wireless/Wireline Call Log Support Network Architecture. The call log gateways (CL MTAs) 105 take call log data messages from underlying telephone networks 52 and 58, formats them as email messages and sends these email messages to the UC platform 101 UC message transfer agent (UC MTA) 74. The UC MTA 74 receives the email messages (call log messages) containing call log records (call log data) and routes the call log messages to the correct subscriber mailbox or mailboxes In Message Store 78. The correct subscriber mailbox is determined by associating telephone numbers in the call log data to subscriber designated telephone numbers in the subscriber account or customer profile. The UC platform 101 includes the UC MTA 74, a web server 55 and email server component. A call placed from a subscriber's telephone 50 is received by an underlying telephone system 52.

The underlying telephone system 52, launches an Off Hook Delay (OHD) or Terminating Access Trigger (TAT) from the Service Switching Point (SSP) to Service Control Point (SCP) 103 when a telephone call is detected. By way of example, the SCPs 103 may be implemented with the Bellcore Integrated Service Control Point, loaded with ISCP software Version 4.4 (or higher), available from Telecordia, Murray Hill, N.J.

The SSP 54 in an originating central office (CO) for the subscriber telephone 50 and the SSP 55 is a terminating CO for the called party telephone 51. However, the terminating CO and the originating CO may be the same, or there may be any number of intervening switches routing the connection between the subscriber telephone 50 and the called party telephone 51. The SSPs 54 and 55 include, for example, 1AESS or 5ESS switches manufactured by Lucent Technologies, Inc., or DMS-100 switches manufactured by Nortel Networks Corporation (Nortel), or AXE-10 switches manufactured by Telefonaktiebolaget LM Ericsson.

The 1AESS switches may use an AIN Release 0.1 protocol and should be equipped with Generic 1AE13.01 (or higher) software and associated AIN SSP features. The 5ESS switches may utilize an AIN Release 0.1 protocol and should be equipped with Generic 5E12 (or higher) software and associated AIN SSP features. The DMS-100 switches (release NA009) may utilize an AIN Release 0.1 protocol and associated AIN SSP features. The AXE-10 switches may utilize an AIN Release 0.1 protocol and should be equipped with Generic 8.07 (or higher) software and associated AIN SSP features. The call service logic of the present invention may be upgraded to accommodate future AIN releases and protocols and future trigger types. Specifications of AIN Release 0.1 SSPs may be found in Bellcore TR-NWT-001285, Switch-Service Control Point Application Protocol Interface Generic Requirements, the disclosure of which is expressly incorporated by reference herein in its entirety.

FIG. 1 further depicts an exemplary data network, associated with the telecommunications network described above, that includes a web client 86, connectable through the Internet 107, or other packet switched data network, to a the web server 55 at the UC platform 101. The web client 86 includes a GUI 87 and associated operating software 85. FIG. 1 indicates the web client 86 being directly connected to the Internet 107, for example, through a digital subscriber line (DSL) or integrated services digital network (ISDN) digital connection. However, any conventional Internet access may be used, including an analog dial-up connection, through a modem (not pictured) on the subscriber's telephone line and an SSP (not shown).

Voice data for the telephone call is transmitted from a PSTN or a voice over Internet protocol (VOIP) network including a PSTN and VOIP gateway 64 (GW)/gatekeeper (GK) 51. The gatekeeper 51 determines where calls coming from the VOIP GW 64 should be routed. Normally calls are routed to gate servers implemented on Cisco equipment. In the present example of the invention the gate servers are the TUI Application Server 80. These servers run on Sun equipment running the Sun Solaris Operating System or on PC's running the Linux operating system. The VOIP GW 64 provides a bridge between the PSTN 52 and the Internet 107 enabling PSTN telephone calls to be converted into VOIP calls. VOIP systems are well known in the art.

As shown in FIG. 1, the subscriber telephone 50 is connected to the local SSP 54 whenever the subscriber telephone 50 goes "off-hook," (i.e., the handset is removed from the cradle or is otherwise activated to receive a dial tone). The outgoing call log service is initiated at this point by an off-hook delay (OHD) trigger, which has been previously set in SSP 54 upon service activation. The SSP 54 launches the OHD trigger each time the subscriber phone goes off-hook and a series of digits adhering to the switch's dial plan are dialed.

The OHD trigger activated by the SSP 54 causes call data to be sent to the SCP 103 for processing, via the existing signaling system 7 (SS7) network (and appropriate STP 56), in a known manner. The call data includes the called party number and the calling party number.

Significantly, the telephone call is not suspended at the SSP 54 switch during execution of the call log service. Rather, the call completes in a normal fashion based, in part, on any instructions from the SCP 103 to the originating SSP 54, and/or the terminating SSP 55. For example, the subscriber and the called party may subscribe to additional telephony services that may be activated by call placement or receipt. These services would continue to be processed during execution of the outgoing call log service. The call is completed, connecting the subscriber telephone 50 with the called party telephone 51 through at least the originating SSP 54.

While the telephone call is being processed and routed, the SCP 103 communicates with the call log gateway 105, which functions separately from the PSTN. In an embodiment of the invention, the interface between the SCP 103 and the call log gateway 105 is a Bellcore GDI client. This GDI client interface provides the capability to send and receive transactions to and from external systems using known transmission control protocol/internet protocol (TCP/IP) with transaction capabilities application part (TCAP) messages. The GDI client therefore enables the SCP 103 to generate messages to request data, send data or invoke an application (InvokeApp) to the CLMTA 105.

The SCP 103 sends an InvokeApp message to the CLMTA 105 via the GDI client 107. The InvokeApp message (also referred to as TCAP message) includes the call log data which may include the calling party number, the called party number, the call type and the call date and time. As stated above, by invoking an GDI interface server external to the PSTN, the SCP 103, the SSP 54 and other PSTN resources may continue processing the call without having to await execution of the outgoing call log service.

However, in an embodiment of the invention, the subscriber may selectively activate and deactivate the call log service as desired, using the web client 86 via the Internet 107, as discussed below, or using a conventional dual tone multi-frequency (DTMF) telephone via an telephone user interface (TUI) 80 system, Alternative embodiments of the invention combine the various server and database functions described above into any practical combination of PSTN and data network systems. According to the invention, the subscriber is able to access his or her incoming and outgoing call log through a data network, such as the Internet independently of PSTN involvement.

Figure 7:
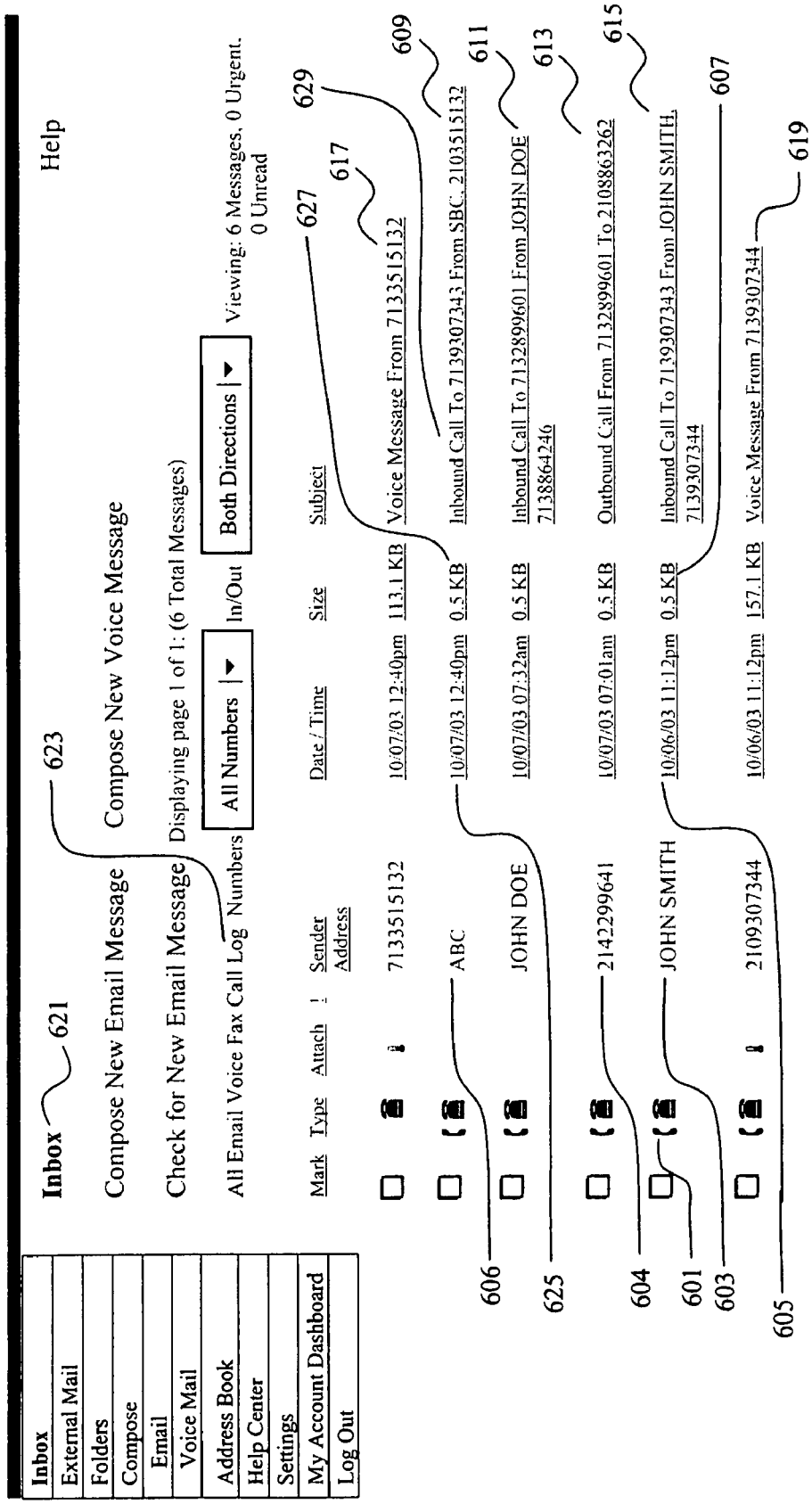
FIG. 7 is an illustration of a GUI call log screen presented to subscriber client via UC server.

A subscriber accesses the call log data over a packet switched data network 107 using the GUI 87 of web client 86. The subscriber accesses the web server 74 through the Internet 107 from the web client 86, using a web browser such as Microsoft Internet Explorer, Netscape Navigator or Hotjava. The web server 74 component serves as a secure access platform, receiving hypertext transfer language protocol (HTTP) messages from the web client 86 and providing hypertext mark-up language (HTML) web pages in response to the subscriber's input. The web pages relate to the subscriber's call log service account, an example of which is depicted in FIG. 7, discussed below.

The subscriber logs in to the subscriber's personal call log service account via the web server 74. The log-in process may include authentication of the subscriber to protect the privacy of the subscriber's outgoing call information. To perform the authentication, the web server 74 contacts the subscriber account database in the master directory server (MDS) 54, which recognizes the access request. The subscriber account database includes all telephone numbers associated with a subscriber. The MDS 54 retrieves the subscriber's account information, which includes the authentication data, all telephone numbers associated with the subscriber and sends the account information to the web server 74 component for processing. The authentication data may include the subscriber's name, account number, personal identification number (PIN) and/or password.

In an alternative embodiment, the subscriber's authentication data is stored at an authentication/subscription information (ASI) server. Implementation of the separate ASI server enables the telecommunications service provider to consolidate authentication processing of a variety of telecommunications services. For example, the outgoing call log service may be offered as part of, or in addition to, a PCM service, as discussed for example in U.S. patent application Ser. No. 09/619,312, filed on Jul. 19, 2000. A shared ASI server reduces redundant data storage and otherwise promotes processing efficiency of all of the services involved.

Upon receiving the authentication data, the web server 74 component prompts the subscriber to enter the matching data from the web client 86, which indicates an ongoing interaction between the web server 74 component and the web client 86. In other words, the web server 74 component causes the display of various web screens at the GUI 87 of the web client 86, to which the subscriber responds. When the entered data does not match the stored authentication data, the web server 74 denies access to the requested account, possibly after allowing repeat attempts, depending on the programming choices of the service provider.

When the entered data matches the stored authentication data, the web server 74 retrieves the substantive incoming and outgoing integrated call log data that is associated with one of the telephone numbers in the subscriber's account. The web server retrieves the call log data from the message store 78 via Access Unit 74. The web server displays consecutive web screens indicating the ingoing call log service and displaying the subscriber's personalized data. The subscriber can thus interact with his or her outgoing call log service account. Alternatively, the web server 74 retrieves the authentication data and the substantive outgoing call log information in a single step to eliminate, for example, processing steps, although the outgoing call log information is not provided to the web client 86 until after successful subscriber authentication. The process enables the subscriber to access the outgoing call log information from any location with networking facilities that allow connection to the data network, whether it is the Internet, a corporate intranet or other TCP/IP network.

Figure 2:
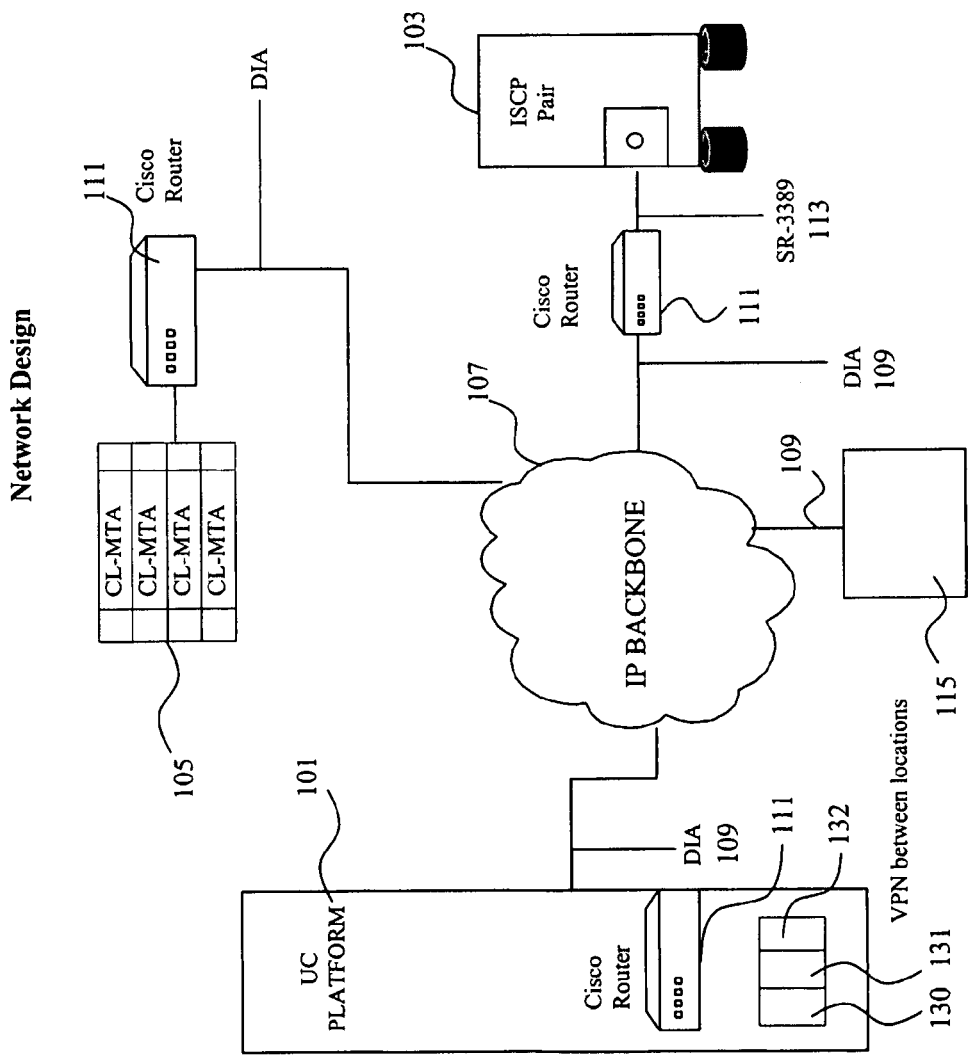
FIG. 2 is a diagram showing basic interfaces to Call Log Message Transfer Agent (CL MTA) in an example of the present invention, according to an aspect of the present invention.

FIG. 2 is a diagram showing basic interfaces to the call log gateway (CL MTA) in an example of the present invention, according to an aspect of the present invention. Turning now to FIG. 2, the basic interfaces to the CL MTA of the present example of the invention are illustrated in schematic fashion. As shown in FIG. 2, an exemplary system comprises CL MTA 105, a Unified Communication (UC) Platform 101, at least one SCP 103 and an Internet Protocol Backbone 107 such as that provided by SBC Communications, Inc. (SBC). A virtual private network (VPN) is provided by routers 111 when desired. Internet Access, such as Direct Internet Access (DIA) provided by SBC is provided for communication between SCPs 103, the UC Platform 101 and the CL-MTA 105. A router such as the Cisco router 111 is provided as an interface between the DIA SMTP protocol 109 and Call Log Gateway (CL-MTA) 105, UC Platform 101 and SCP 103.

The flexible architecture shown in FIG. 2 isolates the SCP from any delays and provides excellent performance and reliability for implementation of the UC system information.

The CL MTA 105 functionally receives a TCAP over TCP/IP message, sent from an underlying telephone system. CL MTA 105 takes the InvokeApp messages, as defined in SR-3389 GDI (referred to herein as TCAP messages and extracts the call log information from the parameters in the SR-3389 InvokeApp ( ) TCAP message. This information is then injected into a CALL LOG GATEWAY INTERWORKING DEVICE, which is the Message Transfer Assistant portion of the CL MTA (also referred to as the Call Log Gateway). CL MTA 105 generates an SMTP call log message, which is then transmitted to the UC MTA 74. The CL MTA 105 also accepts SMTP messages directly from an underlying telephone system 115 which are then transferred to the UC platform 101 UC MTA 74. All call log data is transferred to the UC through the CL-MTA thus providing a common point for charging a tariff for the Call Log service. Thus, any authorized vendor or SCP can communicate with the UC MTA 74 via the CL MTA 105 using an InvokeApp ( ) message SR-3389 GDI (TCAP message) or an SMTP message containing call log data (a call log message). The SMTP messages (call log messages) sent by a vendor to the CL MTA are represented by SMTP message 316 in FIG. 4 and SMTP message 416 in FIG. 5. Similar processing occurs on the UC platform 101 subsequent to receipt of any SMTP call log message at the UC platform 101.

The UC platform 101 in the present example of the invention provides a call log service at the UC that receives an SMTP message from the CLMTA and deposits the message in the subscriber's call log mailbox for display and final disposition by a subscriber via a graphic user interface (GUI). The UC 101 in the present example is implemented on a Sun Solaris V440 processor available from Sun Microsystems, Inc. running DCL Software available from Data Connections Limited for email and MDS 54 implemented as a a lightweight directory access protocol (LDAP) database. The UC provides an underlying standard email server and mailbox system, well known in the art having novel functionality described herein over the standard email functionality. The UC also includes multi-site determination at the UC platform in order to route the SMTP message correctly to the proper UC site 101, 102, etc. when multiple UC sites are utilized.

The SCP receives either a Terminating Attempt Trigger (TAT) or Off Hook Delay Trigger (OHD) from SSP, the SCP and then makes a call through the SR-3389 Interface using an InvokeApp ( ) message, which contains the various call log data information fields passed as parameters in the function invocation. Examples of the call log data information passed in the InvokeApp( ) are described below. The destination of the InvokeApp( ) message invocation is the CL MTA which responds immediately to the SCP prior to performing translation of the InvokeApp( ) message into an SMTP message. The immediate response is done to insure that performance at the SCP is not adversely affected and to emulate asynchronous messaging between the SCP and the CLMTA.

Figure 3:
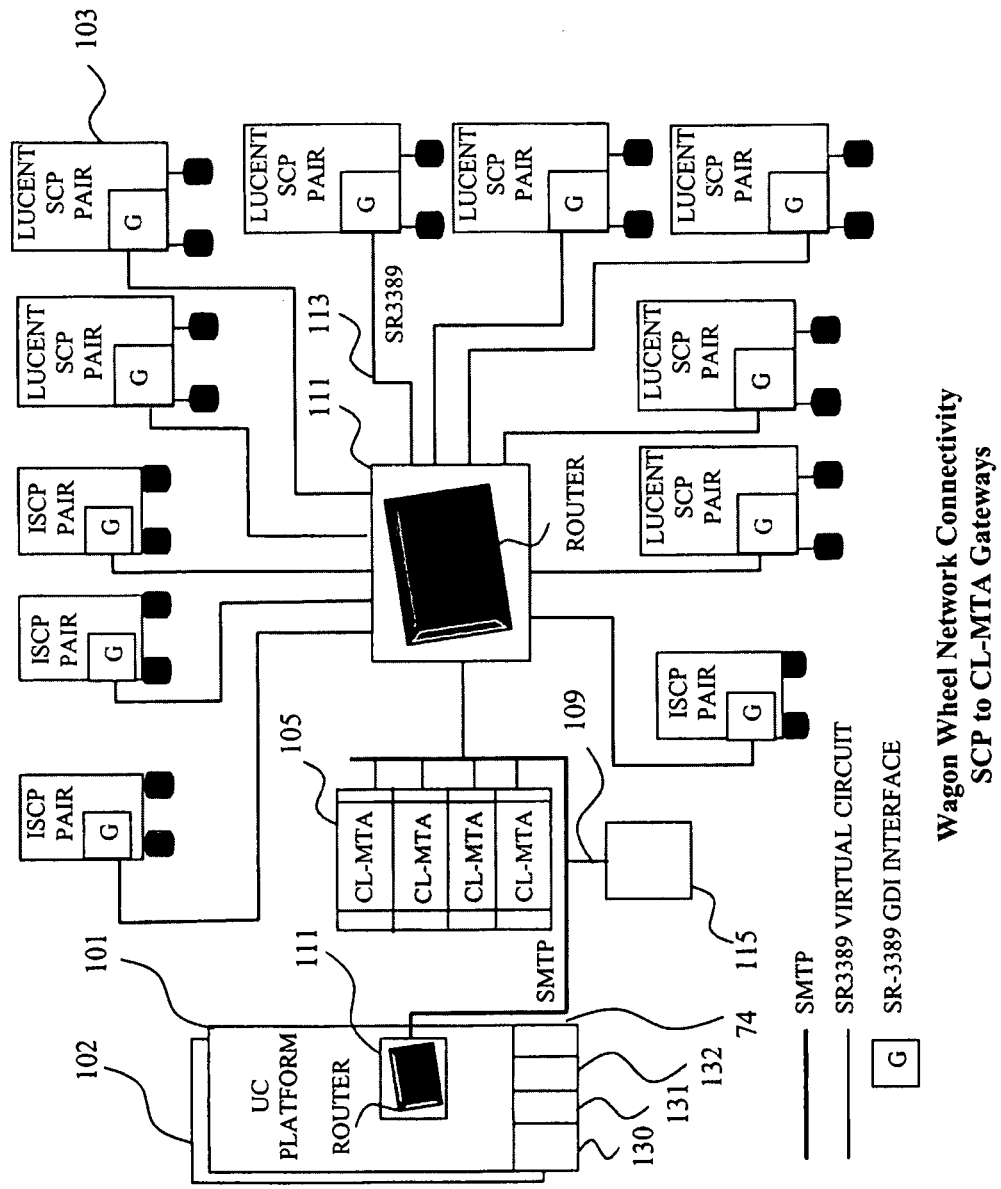
FIG. 3 is diagram showing wagon wheel network connectivity between the CL MTAs and SCPs, according to an aspect of the present invention.

FIG. 3 is a diagram showing the UC Platform, CLMTA and SCP overall architecture, according to one example of the present invention. Turning now to FIG. 3, SCPs 103 and the CL MTA 105 (call log gateway) communicate using SR-3389 GDI TCAP style messages. The CL MTA 105 communicates with the UC MTA 74 on the UC Platform using SMTP messages. Other suitable asynchronous messaging protocols can be used between the CL MTA 105 and the UC MTA 74, in place of SMTP email, as long as an agreed upon mapping and protocol are in place between the UC MTA and the CL MTA. SCPs 103 use SR-3389 GDI circuits 113 connected to Cisco routers 111 communicate via the Internet 107 using an acceptable Internet protocol, such as Direct Internet Access (DIA) 109 provided by SBC. Routers 111 in the present example utilizes a VPN from the SCP 103 locations to the CL MTA complex 105. In the current example, a single router 111 is provided between the SCP 103 locations and the CL MTA complex 105, however, an additional router may be placed for CLMTA complex 105. The routers 111 include firewall capability and VPN. In the example of FIG. 3, a third party vendor 115 is shown communicating via a link 117 to the CL MTA complex 105 via either TCAP messages or SMTP call log messages. The third party vendor uses the InvokeApp ( ) mapping to send inbound and outbound call log data to from an SCP to the CL-MTA or uses the SMTP mapping to send call log data to the CL MTA.

In the current example of the present invention, a vendor communicating with the UC Platform via the CL-MTA using InvokeApp( ) implements a TCP/IP socket server implementation to accept socket connections from the SCP. The SCP will act as the client in this instance. The vendor will accept SR-3389 messages using GR-246-CORE ANSI TCAP encoding.

There are only a few of the TCAP messages used in the current exemplary implementation of the invention. Two TCAP messages used in the current example are the InvokeApp( ) and InvokeAppResp( ) messages. In the current example of the invention the InvokeApp( ) SR-3389 Table D-1 Request Data Message is used to carry call log information as parameters to this function. Also the InvokeApp( ) SR-3389 Table D-3 Response Message is used. In addition to these two messages, in the present example of the invention, the vendor is capable of answering a basic "keep alive" request per SR-3389 Section 2.2.2.

Figure 4:
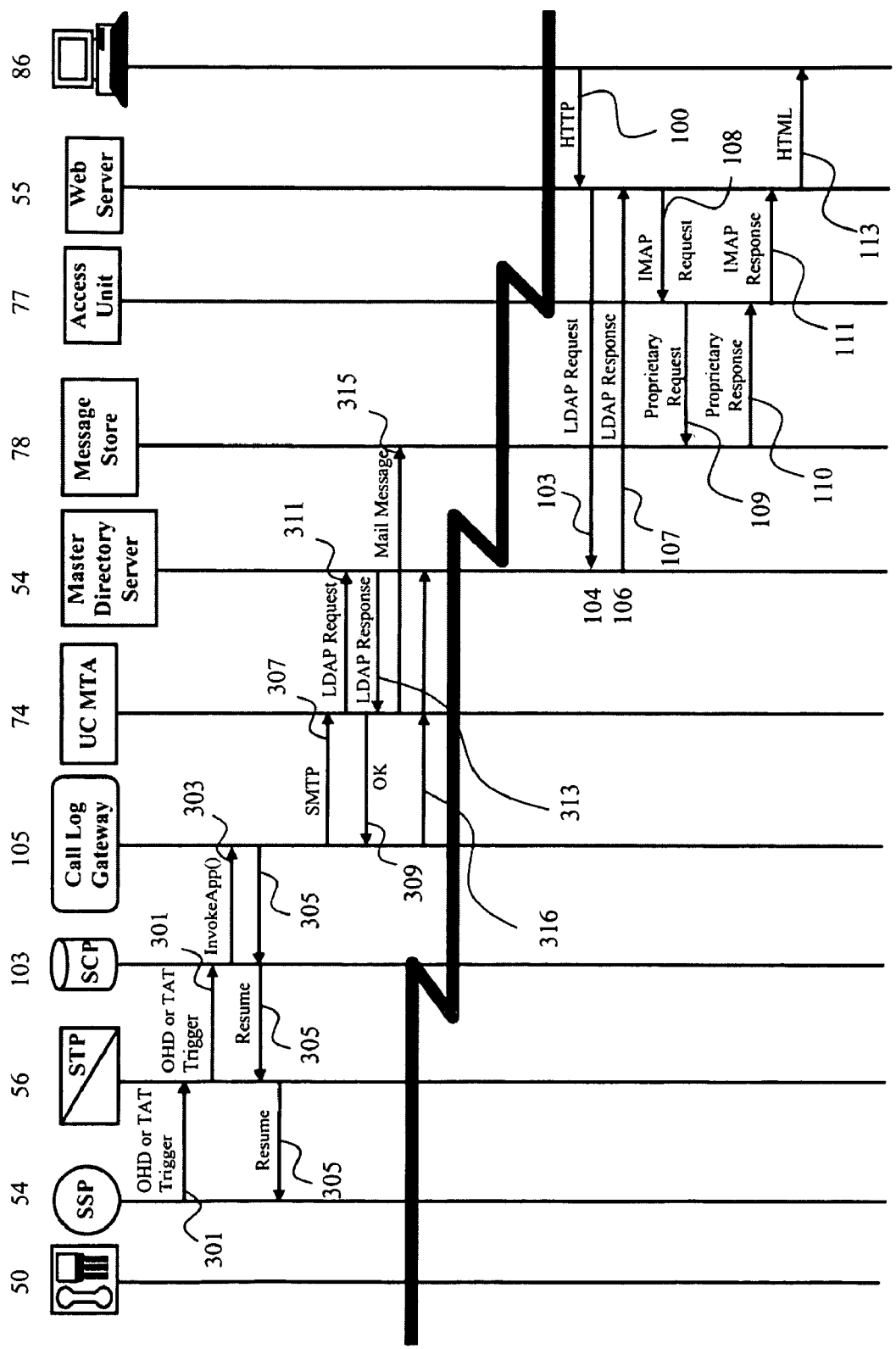
FIG. 4 is an exemplary message flow for processing a terminating attempt trigger (TAT) invocation of an InvokeApp message, according to an aspect of the present invention.

Turning now to FIG. 4, a diagram of the basic message flow for a Terminating Attempt Trigger (TAT) is illustrated. When an incoming call arrives for a subscriber telephone 50 the SSP 54 sends a TAT message sends a TAT message 301 to an STP 56 which sends it to the SCP 103. The SCP 103 then sends an InvokeApp( ) message 303 to the Call Log Gateway 105. To emulate asynchronous communication, the SCP sets a short timer of, for example, 300 milliseconds and times out, thereby continuing SCP processing without waiting on a response to the InvokeApp( ) message. The InvokeApp( ) message 303 contains the call log data elements, that is, originating number (OrgNbr), caller name (CNAME), and called number (CalledNbr). The Call Log Gateway 105 sends an acknowledge message 305 within a fixed and relatively immediate time period, for example, 300 milliseconds to the SCP to closely emulate asynchronous communication with the SCP to alleviate performance problems or delays at the SCP. The Call Log Gateway 105 extracts the call log data elements from the InvokeApp( ) message and translates the data elements into an SMTP message 307 to UC MTA 74.

In the present example of the invention, a Sun Solaris V440 running DCL software implements the functionality of the Call Log Gateway. Other processors including a Personal Computer running a Linux operating system are suitable for implementing the Call Log Gateway.

The UC MTA 74 accepts the SMTP message 307 and issues an LDAP request at step 311 to MDS 54. The MDS 54 responds with an LDAP response at step 313 to the UC MTA 74. The UC MTA then sends the call log data in a mail message at step 315 and thereby places the call log message and call log data into the correct subscriber mailbox in message store 78. The call log data is later available as an integrated call log display or telephone announcement to a subscriber. The integrated call log is based on the MDS subscriber account database and all telephone numbers associated with the subscriber account. SMTP messages are used in the current example, however, other known asynchronous message protocols are acceptable for communication between the underlying Call Log Gateway 105 and the UC MTA 74 and between underlying telephone systems and the Call Log Gateway. Vendors can communicate with the Call Log Gateway via SR-3389 InvokeApp( ) messages (TCAP Messages), SMTP messages or other known asynchronous message protocols. ERT routes the SMTP message from the Call Log Gateway between multiple UC sites 101, 102 for processing by an appropriate UC MTA 74. The UC MTA 74 returns an OK message 309 to the CL MTA after receipt of the call log message 307.

If the CNAME is missing from the call log message email sent from the CL MTA, the UC MTA sends an LDAP request or a CNAME Missing message at step 311 to the MDS requesting that the MDS lookup the originating number caller name. The MDS returns a message at step 313 with the CNAME or an indication that the CNAME is UNKNOWN. The UC MTA then sends a Call Log Info Available message at step 315 containing the call log data to the UC Mail subscriber's box in message store 78 where the call log data is available to the subscriber for display and dispensation as an integrated call log via TUI application 80 or web client 86. Thus, there is no intermediate repository of the call log data sent from the telephone system as the data goes directly into the subscriber's mail box without being stored in a database.

Figure 5:
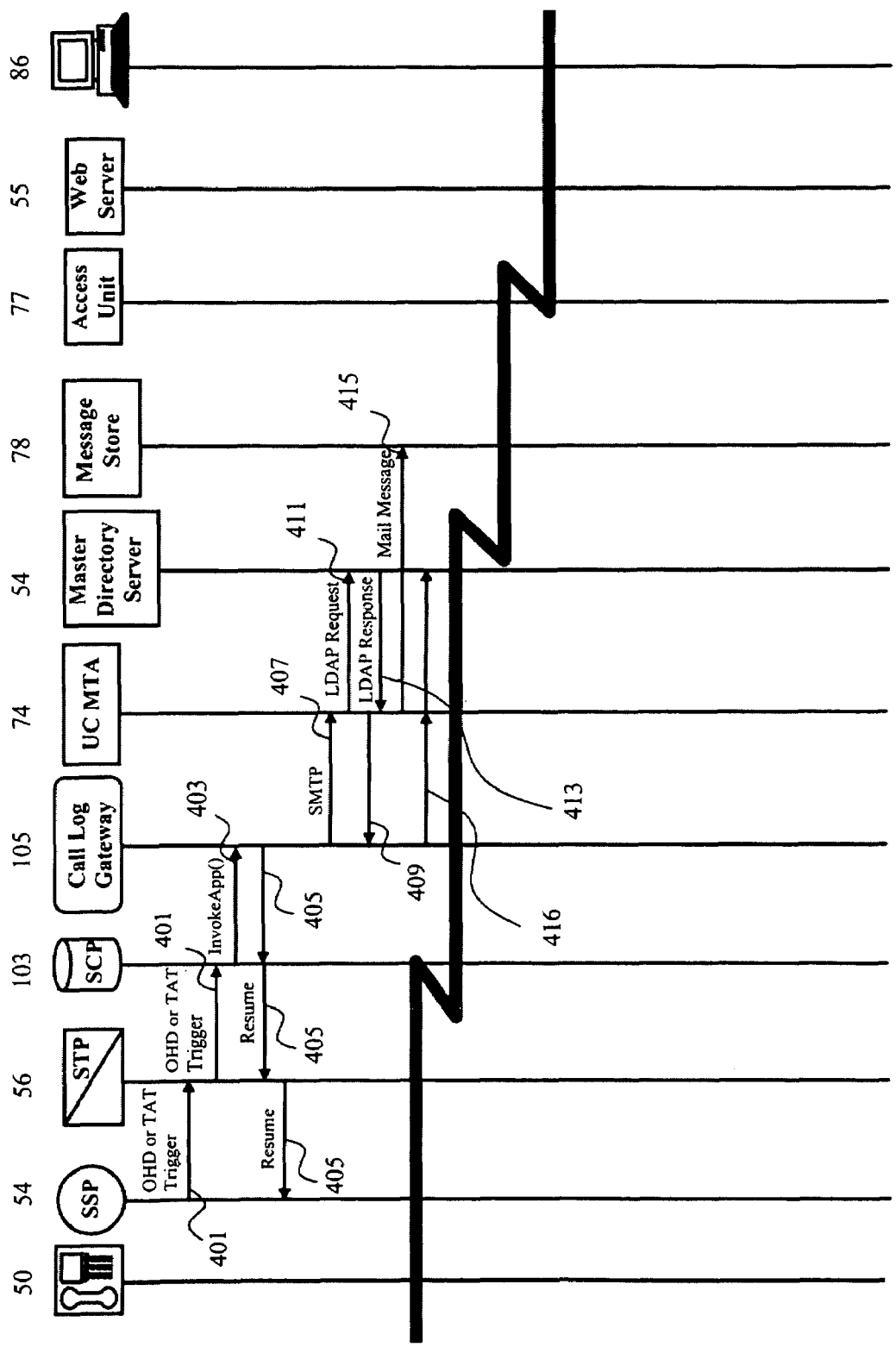
FIG. 5 is an exemplary message flow for processing an off hook delay (OHD) invocation of an InvokeApp message, according to an aspect of the present invention.

Turning now to FIG. 5, a diagram for the basic message flow for processing the Off-Hook Delay (OHD) Trigger 401 is shown. The OHD trigger is sent to the SCP from an STP associated with a subscriber call when a subscriber removes the telephone receiver to go off hook and dials the appropriate number of digits to place a call. Upon receiving the OHD trigger, the SCP sends an InvokeApp( ) message containing call log information to the Call Log Gateway as shown in FIG. 5. The SCP generates an InvokeApp( ) message 403 to the Call Log Gateway. The InvokeApp( ) message 403 includes an OD_IND (out dial indicator) Originating Number (OrgNbr), CNAME and Called Number (CalledNbr). Message flow is similar to flow shown in FIG. 4. The CL MTA 105 sends an SMTP message 407 to the UC MTA/ERT. The SMTP message includes a CNAME, Called OD_Indictator on the subject line.

Figure 6:
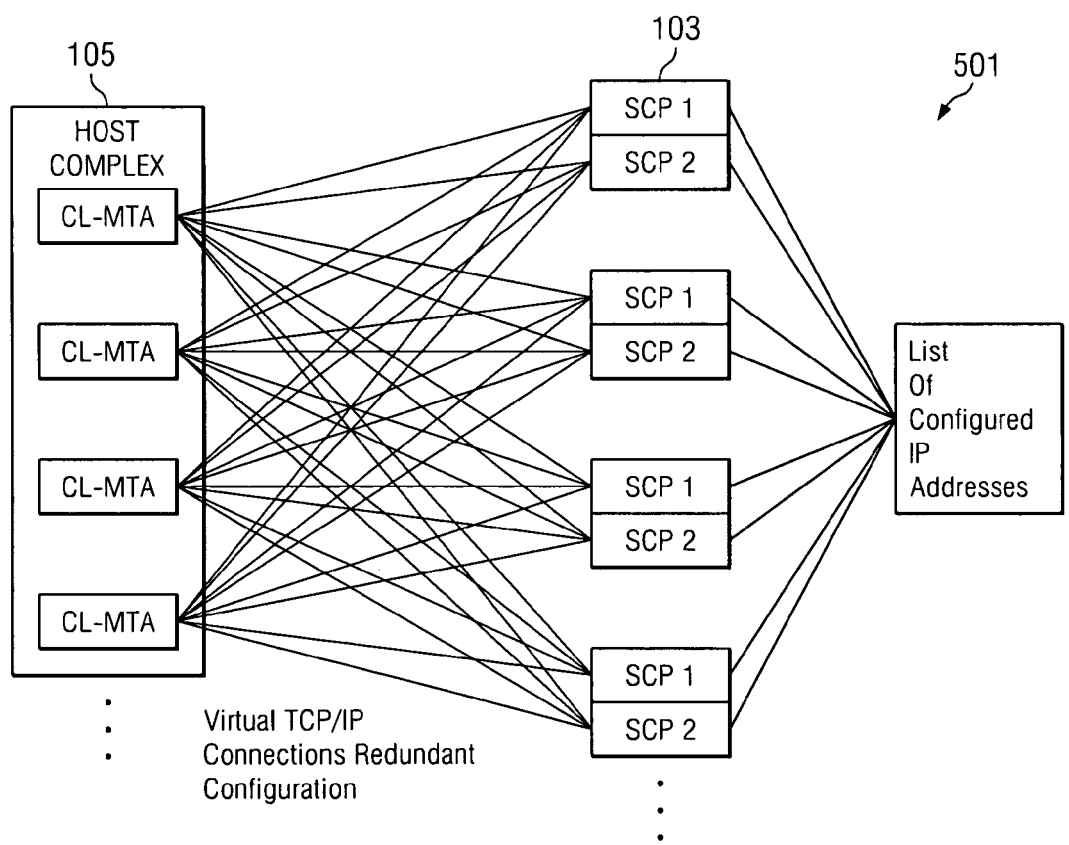
FIG. 6 is a block diagram illustrating an SCP to CL MTA Redundant Connection Scheme in the current exemplary implementation of the invention, according to an aspect of the present invention.

Turning now to FIG. 6, in the present example of the invention the SCP to CL MTA communications use a redundant connection scheme as shown in FIG. 6. Each CL MTA unit in the CL MTA 105 host complex is redundantly connected to each SCP pair 103 via virtual TCP/IP Connections Redundant Configuration 501. The InvokeApp( ) (TCAP) message, overhead and keep alive messages will be encoded using ASN.1 BER (Basic Encoding Rules).

As discussed above, the present example of the invention maps the protocol inter-exchange between TCAP SR 3389-GDI InvokeApp( ) message and an SMTP call log message or another asynchronous message protocol call log message. The present example of the invention uses the InvokeApp( ) function of the SR-3389 GDI specification mapped to SMTP fields in a call log message to communicate call log data to a CL MTA and subsequently the UC Platform. This mapping enables subscriber call log information for both incoming and outgoing calls from multiple telephone systems for multiple telephone numbers associated with a subscriber to be displayed at a Web Client 86 GUI 87 to a subscriber via HTTP or another protocol present in the UC platform.

Inbound and outbound call logs for multiple wireless and wireline telephone systems are associated with a particular UC. At a high level, the call log data provided in the call logs is the calling number, called number, and date/time the call was placed. If a calling number or called number in the call log data match one of a subscriber's telephone numbers in the subscriber's LDAP call log information in the MDS, the call log message is placed in the subscriber's integrated call log. On inbound calls, the LDAP CNAM information is provided. Turning now to FIG. 7, a GUI web client GUI screen displaying an integrated subscriber call log via the Internet is shown. Each call log line 609, 611, 613 and 615 is displayed to a subscriber along with voice mail data 617, 619. Note that multiple telephone numbers (210 930 7343 and 210 289 9601) associated with a subscriber are represented on integrated call log at lines 609 and 611. Each call log line includes an icon 601, which is distinct from other icons (voicemail, email, fax) which may be shown on the screen. Under the "Inbox" "All" tab, a subscriber will see all emails, voicemails, and faxes. Under the "Inbox" "Email" tab, only emails are shown. Under the "Inbox" "Voice" tab, only voicemails are shown. Under the "Inbox" "Fax" tab, only faxes are shown. Under the "Inbox" 621 "Call Log" tab 623 the call log is shown. In the present example of the invention, Call log information is shown under the "Call Log" tab.

For each outbound call 613 a "Sender Address" 604 comprising the number originating the call, call "Date/Time" 625, size 627 and call "Subject" 629 comprising the number originating the call and the number called is displayed. For each inbound call a "Sender Address" 604 comprising the person's name 601 or underlying telephone system company name 606 originating the call, call "Date/Time" 625, size 627 and call "Subject" 629 comprising the number originating the call and the number called is displayed.

The directory database MDS may be a line information database (LIDB), which is maintained independently of the PSTN and updated appropriately by the service provider to assure provision of current information. The invention may include any comparable publicly or privately maintained database, including a Lucent LDAP database and server.

When accessing call information using the Internet, a subscriber accesses the web server 55 using the GUI 87 at web client 86, which may be, for example an IBM Pentium based personal computer running Microsoft Windows operating system, available from Microsoft Corporation, Inc. In an embodiment, the web client software 85 incorporates a web browser, such as Microsoft Internet Explorer, Netscape Navigator or Hot Java, available from Sun Microsystems, Inc. An embodiment of the invention with respect to the web server 55 can be implemented on a Linux or Microsoft Windows operating system and Apache web server software, available from the Apache Software Foundation, or Jigsaw web server software, available from World Wide Web Consortium (W3C). Alternatively a TUI 80 is used to announce the call log and call log information to a user.

FIG. 8 describes Inbound Call Log Mapping InvokeApp( ) parameters to email fields for transmission of call log data in call log messages to the UC MTA. FIG. 9 describes Outbound Call Log Mapping InvokeApp( ) parameters to email fields for transmission of call log data in call log messages to the UC MTA (also referred to as MMTA or modified MTA). Some of the call log message fields used in the email messages are static and will be supplied by the GDI to SMTP process running on the Call Log Gateway (CL MTA) 105.

Turning now to FIG. 8, the fields used in the Inbound Call log mapping of the InvokeApp( ) function are defined under four column headings as follows: InvokeApp ( ) Element Identifier Parameter number, EMAIL Field, Value and Description. Reading across under the four column headings for InvokeApp ( ) Element Identifier Parameter Number 1 601 it is shown that this parameter 601 is mapped to the Email "From" field and has value of "CNAME". As shown in the description of the parameter, if the CNAME is available it is extracted from the InvokeApp( ) parameter 601 and inserted into the email "From" field. InvokeApp ( ) Element Identifier Parameter Number 2 603 is mapped to the email "From" field and has a value of "<calling-telephone-number>" which is the telephone number from which the call originates. InvokeApp ( ) Element Identifier Parameter number 3 605 is mapped to the email "From" field and has a value of "@CLG-FQDN" which is a fully qualified domain name for the CL MTA at the UC platform. This is the address to which the email is sent by the CL MTA.

The InvokeApp ( ) Element Identifier Parameter number 4 607 is mapped to the email "Reply-to" field and has a value of <call-log-postmaster> which is chosen by an operations staff of a subscribing vendor. The InvokeApp ( ) Element Identifier Parameter number 5 609 is mapped to the "Reply-to" email field and has a value of "@MMTA-FQDN" which is a UC MTA Call Log Fully Qualified Domain Name. InvokeApp Element Identifier Parameter number 6 611 is mapped to the email "To" field and has a value of <called-telephone-number> which is the dialed number. InvokeApp Element Identifier Parameter number 7 613 is mapped to the "To" field in the email and has a value of @MMTA-FQDN which is a Call Log Fully Qualified Domain Name. InvokeApp Element Identifier Parameter number 8 615 is mapped to the "email message body" field in the email and has a value of mm/dd/yyyy HH:MM:SS (AM/PM) which is the date and time of the incoming call.

Turning now to FIG. 9, the fields used in Outbound Call Log Mapping InvokeApp( ) parameters are defined under four column headings InvokeApp Element Identifier Parameter Number, Email field, Value and Description. InvokeApp Element Identifier Parameter number 1 701 is mapped to the Email "From" field and has value of "<calling-telephone-number>" which is the number from which the outbound call originated. InvokeApp Element Identifier Parameter number 2 703 is mapped to the email "From" field and has a value of "@CLG-FQDN," a fully qualified domain name, the domain name for the call log gateway. InvokeApp Element Identifier Parameter Number 3 705 is mapped to the "Reply-To" email field and has a value of <call-log-postmaster>, which is the UserID to which reply messages are sent. InvokeApp Element Identifier Parameter number 4 707 is mapped to the "Reply-to" field in the email and has a value of @MMTA-FQDN which is a Fully Qualified Domain Name of an Enhanced Service provider providing call log information. InvokeApp Element Identifier Parameter number 5 709 is mapped to the email "To" field and has a value of <calling-telephone-number>. InvokeApp Element Identifier Parameter number 6 711 is mapped to the email "To" field and has a value of "@MMTA.FQDN" which is the Calling Number Modified MTA. InvokeApp Element Identifier Parameter number 7 713 is mapped to the "Subject" field in the email and has a value of <called-telephone-number> which is the dialed Number. InvokeApp Element Identifier Parameter number 8 715 is mapped to the "email body" field in the email and has a value of mm/dd/yyyy HH:MM:SS (AM/PM) which is the date and time of the outgoing call.

In the present example of the invention, separate vendors and/or telephone companies are enabled to transmit individual call log records to the UC system using the Simple Mail Transfer Protocol (SMTP) over TCP/IP. Further, these "email" messages containing call log information are transmitted over the Internet in an unencrypted manner. If end-to-end encryption is desired, an encrypted VPN that tunnels through the public Internet is provided. One of the integration points between the voice network provider call log systems and the UC MTA on the UC platform is the format and content of the email messages transmitting the call log data.

All participants in the UC call logging system of the present example of the invention utilize a common message format such as that described in the current example of the invention. In addition to the body of the email message, the message format includes Internet mail message header information as well. A description of the Internet mail message header formats can be found at http://cr.yp.to/immhf.html which includes information regarding the IETF SMTP protocol descriptions as well as industry conventions. Both the protocol definitions and the industry definitions are germane to the operation of the present example of the invention.

For inbound call log messages, the message header fields 1001, 1003, 1005 and 1007 and the associated data values for information populating the associated fields in the message header are shown in FIG. 10. FIG. 11 describes the Inbound Call Log Email Message Header Variables 1101, 1103, 1105, 1107, 1109 and 1111. The email message contents are broken down to a line-by-line view. Each line is separated by Line Feed (LF). For formatting reasons, some of the lines may be spread across multiple lines in the table. Line Feeds and Carriage Returns should not be used inside a line at implementation. Inbound call log message body elements 1201, 1203 and 1205 are described in FIG. 12. Inbound call log message body variables 1301, 1303, 1305, 1307, 1309, 1311, 1313, 1315, 1317 and 1319 are described in FIG. 13.

For outbound call log messages, the message header fields and the associated data values expected to populate the associated fields 1401, 1403, 1405 and 1407 are shown in FIG. 14. For formatting reasons, some of the lines may be spread across multiple lines in the table. Line Feeds and carriage returns should not be used inside a line at implementation. The variables 1501, 1503, 1505, 1507 and 1509 used in the outbound call log email message header are described in FIG. 15. The outbound call log email message body formation 1601, 1603, 1605 and 1607 is described in FIG. 16. The outbound call log email message body variables 1701, 1703, 1705, 1707, 1709, 1711, 1713, 1715 and 1717 are described in FIG. 17.

Figure 18:
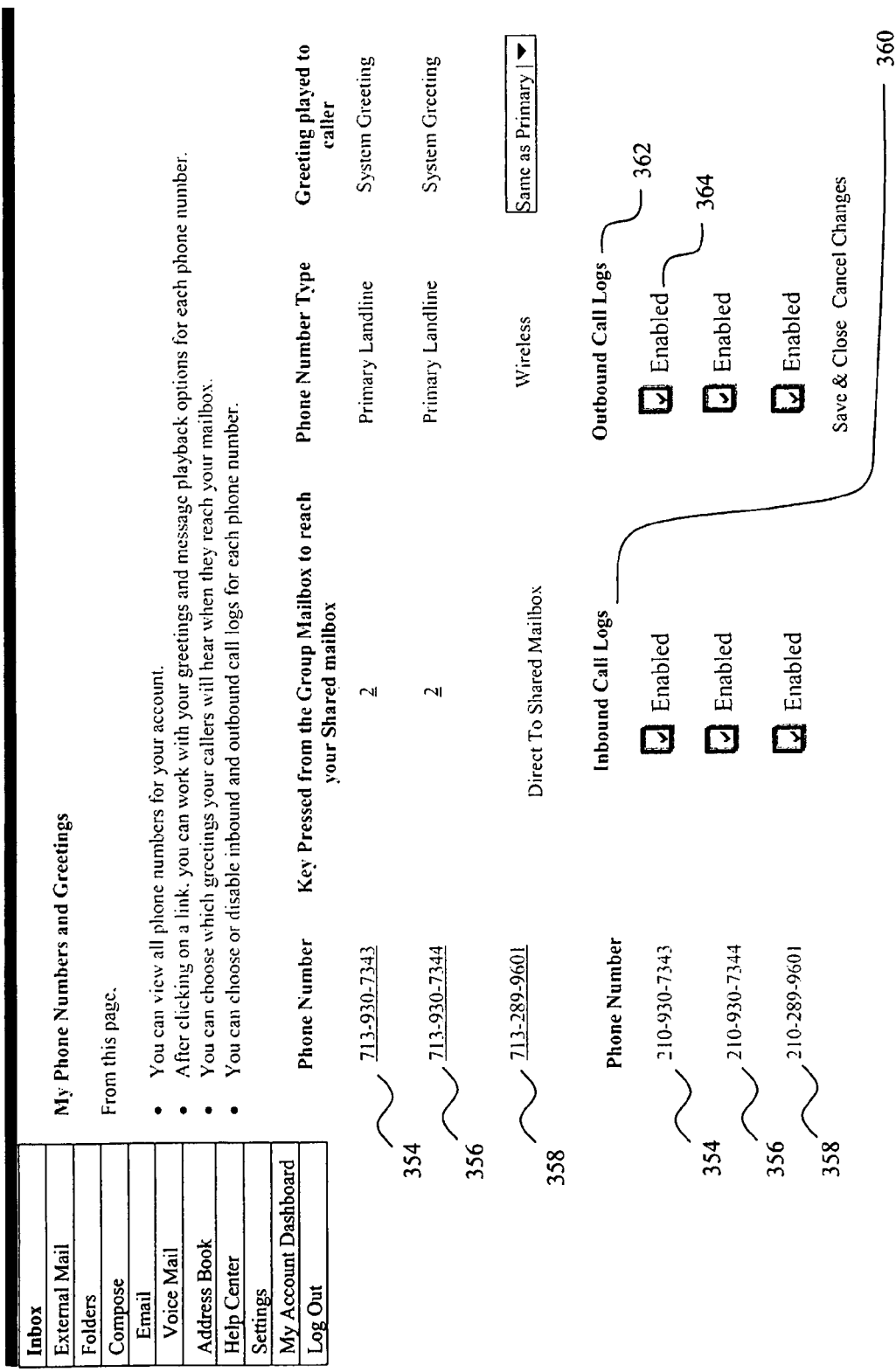
FIG. 18 illustrates an example of a configuration access screen available to a user via a graphical user interface (GUI) in the present example of the invention.

Turning now to FIG. 18, an example of a configuration screen provided by the GUI for the integrated call log of the present invention is illustrated. As shown in FIG. 18, the subscriber can enable and disable both inbound call logs 360 or outbound call logs 362 independently by selecting or not selecting the enabled button 364 associated with each telephone number 354, 356 and 358 associated with a subscriber. The subscriber can enter telephone numbers for which he wants call log information entered into the integrated call log. The telephone numbers for the integrated call log are entered by the subscriber are stored in the subscriber's account as a customer profile in the MDS. The enabled and disabled status for each telephone number is also stored in the MDS.

A subscriber's exemplary interaction with call log telephone numbers and diabled/enabled status for each call log telephone number as stored in the MDS is depicted in the call flow diagram of FIG. 4. The subscriber is able to access the call log configuration information in the MDS 54 as well as the call log in the Message Store 78 via a telephone over the TUI Application server 80 or at a web client 86 via the Internet, thereby greatly increasing flexibility and convenience of the call log. FIG. 7 depicts interaction with voicemail over the Internet, using a GUI, for accessing and updating the call log configuration information discussed above. In order for the subscriber to access call log configuration information via the Internet 57, the subscriber accesses a unique uniform resource locator (URL) associated with the service provider. The URL is an address and identifies the appropriate protocol for communicating with the service over the Web. The MDS contains the call log configuration information. The call log messages are stored as email in the Message Store 78 and accessed by the Web Server 55 through the Access Unit 77. The web server uses the call log configuration information and the call log messages to render web screens to enable the subscriber to configure the call log as well as review the call log and delete messages from the call log once they have been reviewed. When the subscriber accesses the Internet, the Web server 55 provides call log Web screens rendered from the subscriber profiles and call log information stored in the LDAP database.

As shown in FIG. 4, the subscriber sends an HTTP message from the web client 86 at step 100. At step 103 the web server sends an LDAP request to MDS 54 to access the call log and call log information. The Web server 55 thus accesses the MDS 54, which stores and updates the call log and call log information in the MDS at step 103. The Web Server 55 receives HTTP messages from the subscriber Web Client 70 and provides HTML Web pages in response to the subscriber's input. The Web pages relate to the subscriber's call log configuration information in the MDS base 54 and the integrated call log.

The Web Server uses the information stored in the MDS to render GUI screens to the end-user at the web client. The user provides authentication information to access their account. The Web Server performs the authentication at step 104 and 106. The Web Server queries the subscriber for an account number and associated password, which confirms the user's identity. The Web Server then retrieves the account number and associated password information the MDS to confirm that the subscriber is an authorized user. After successful authentication, the Web Server retrieves the call log and call log configuration information from the Message Store 75 via the Access Unit 77 by sending an IMAP request to Access Unit 77 at step 108. The Access Unit sends a proprietary request to Message Store 78 at step 109. Message store sends a proprietary response to the Access Unit at step 110. The proprietary response includes the integrated call log which is sent in an IMAP response at step 111 to the web server. The web server sends the call log to the web client as an HTML message at step 113.

The subscriber can access the integrated call log and call log configuration information using a DTMF telephone. The subscriber calls an access number for their area from any DTMF telephone, which accesses the TUI application 80. The interaction between the user and the UC platform components is the same as with the web client except that call log information and the call log are announced over the DTMF telephone via the Text To Speech (TTS) 79 application and commands are entered via the DTMF telephone keypad.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods and uses such as are within the scope of the appended claims.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, HTML), and public telephone networks (ISDN, ATM, XDSL) represent examples of the state of the art. Such standards are periodically superseded by faster or more efficient equivalents having essentially the same functions. Accordingly, replacement standards and protocols having the same functions are considered equivalents.

What is claimed is:

1. A telecommunication system for providing a call log associated with a subscriber, comprising:

a) at least one telephone network for receiving call log data associated with at least one subscriber telephone number, said telephone network sending a call log message in response to receiving said call log data associated with the at least one subscriber telephone number; and b) a communication platform for receiving said call log message and associating said call log message with said call log associated with said subscriber, said communication platform providing said call log associated with the subscriber in response to a request;

wherein the at least one telephone network maps the call log data from a transaction capabilities application part (TCAP) message to a simple mail transfer protocol (SMTP) message.

2. The telecommunication system of claim 1, wherein the at least one telephone network further comprises a plurality of telephone networks for receiving call log data associated with at least one of a plurality of subscriber telephone numbers, at least one of said plurality of telephone networks sending a call log message in response to receiving said call log data associated with said at least one of subscriber telephone numbers.

3. The telecommunications system of claim 1, wherein the call log data associated with the at least one subscriber telephone number is associated with an inbound call or outbound call associated with the at least one subscriber telephone number.

4. The telecommunication system of claim 1 wherein the at least one telephone network further includes a call log gateway that maps the call log data from the TCAP message to the SMTP message.

5. The telecommunication system of claim 4 further comprising:
(i) a switch that launches a query in response to a telephone call associated with at least one subscriber telephone number; and
(ii) a service control point that sends the call log data to the call log gateway in response to the query.

6. The telecommunication system of claim 5 wherein the switch launches the query in response to the telephone call when a preset condition is met.

7. The telecommunication system of claim 6 wherein the preset condition is at least one of (i) the subscriber telephone is busy; and (ii) the subscriber telephone is not answering.

8. The telecommunication system of claim 1 wherein the at least one telephone network sends the call log message over an internet.

9. The telecommunications system of claim 1 wherein the at least one telephone network includes one of (i) a public switched telephone network ("PSTN"), and (ii) a wireless telephone network.

10. The telecommunication system of claim 1 wherein the communication platform sends the call log via a data network in response to a request received via the data network.

11. The telecommunication system of claim 1 wherein the call log data relates to at least one of (i) an inbound call and (ii) an outbound call.

12. The telecommunication system of claim 11 wherein the call log data includes at least one parameter having at least one value and wherein the at least one telephone network maps the at least one parameter to at least one asynchronous message field.

13. The telecommunication system of claim 1 wherein the call log data is in a TCAP message and includes parameters having parameter values (i) caller name (CNAM), (ii) calling telephone number, (iii) call log gateway domain name, (iv) call-log-postmaster, (v) communication platform domain name associated with the call log postmaster (vi) called telephone number (vii) communication platform domain name associated with the called telephone number; and (viii) date and time associated with the call associated with the subscriber telephone.

14. The telephone communication system of claim 13 wherein the at least one telephone network maps the parameters values respectively to SMTP e-mail fields (i) From, (ii) From, (iii) From, (iv) Reply to, (v) Reply to, (vi) To (vii) To (viii) e-mail body.

15. The telephone communication system of claim 1 wherein the call log data is in a TCAP message and includes parameters having parameter values (i) calling telephone number, (ii) call log gateway domain name, (iii) call log postmaster, (iv) communication platform domain name, (v) calling telephone number (vi) communication platform domain name, (vii) called telephone number, (viii) date and time associated with the call associated with the subscriber.

16. The telephone communication system of claim 15 wherein the at least one telephone network maps the parameters values respectively to SMTP e-mail fields (i) From, (ii) From, (iii) Reply To, (iv) Reply To, (v) To, (vi) To, (vii) Subject, (vii) e-mail message body.

17. The telecommunications system of claim 1 wherein the communication platform includes a mailbox associated with the subscriber telephone for storing call log associated with the subscriber telephone.

18. The telephone communication system of claim 1 wherein the at least one telephone network includes a plurality of telephone networks and wherein each said telephone network is adapted to send a call log message to the communication platform as an SMTP message over a data network.

19. A method for providing a call log associated with a subscriber, comprising:
a) receiving call log data associated with at least one subscriber telephone number in at least one telephone network;
b) sending a call log message in response to said call associated with the at least one subscriber telephone number;
c) receiving said call log message at a communication platform;
d) associating said call log message with said call log associated with said subscriber;
e) providing at said communication platform said call log associated with the subscriber in response to a request; and
f) mapping the call log data from a transaction capabilities application part (TCAP) message to a simple mail transfer protocol (SMTP) message;
wherein the communication platform includes a mailbox associated with the subscriber telephone for storing said call log associated with the subscriber telephone.

20. The method of claim 19, receiving call log data relating to a call associated with at least one of a plurality of subscriber telephone numbers in at least one of a plurality of telephone networks; and
sending a call log message form the at least one of a plurality of telephone networks in response to receiving said call log data associated with said at least one of subscriber telephone numbers.

21. The method of claim 19, wherein the call log data associated with the at least one subscriber telephone number comprises an inbound or outbound call associated with the at least one subscriber telephone number.

22. The method of claim 19 wherein the at least one telephone network further includes a call log gateway that maps the call log data from the TCAP message to the SMTP message.

23. The method of claim 22 further comprising:
(i) launching a query from a switch in response to the telephone call; and (ii) sending the call log data from a service control point to the call log gateway in response to the query.

24. The method of claim 23, wherein the switch launches the query in response to the telephone call when a preset condition is met.

25. The method of claim 24 wherein the preset condition is at least one of (i) the subscriber telephone is busy; and (ii) the subscriber telephone is not answering.

26. The method of claim 19, further comprising:
sending the call log message over the Internet.

27. The method of claim 19 wherein the at least one telephone network includes one of (i) a public switch telephone network ("PSTN"), and (ii) a wireless telephone network.

28. The method of claim 19 wherein the communication platform sends the call log via a data network in response to a request received via the data network.

29. The method of claim 19 wherein the call log data relates to at least one of (i) an inbound call and (ii) an outbound call.

30. The method of claim 29 wherein the call log data includes at least one parameter having at least one value and wherein the at least one telephone network maps the at least one parameter to at least one asynchronous message field.

31. The method of claim 19 wherein the call log data is in a TCAP message and includes parameters having parameter values (i) caller name (CNAM), (ii) calling telephone number, (iii) call log gateway domain name, (iv) call-log-postmaster, (v) communication platform domain name associated with the call log postmaster (vi) called telephone number (vii) communication platform domain name associated with the called telephone number; and (viii) date and time associated with the call associated with the subscriber telephone.

32. The method of claim 31 wherein the at least one telephone network maps the parameters values respectively to SMTP e-mail fields (i) From, (ii) From, (iii) From, (iv) Reply to, (v) Reply to, (vi) To (vii) To (viii) e-mail body.

33. The method of claim 19 wherein the call log data is in a TCAP message and includes parameters having parameter values (i) calling telephone number, (ii) call log gateway domain name, (iii) call log postmaster, (iv) communication platform domain name, (v) calling telephone number (vi) communication platform domain name, (vii) called telephone number, (viii) date and time associated with the call associated with the subscriber.

34. The method of claim 33 wherein the at least one telephone network maps the parameters values respectively to SMTP e-mail fields (i) From, (ii) From, (iii) Reply To, (iv) Reply To, (v) To, (vi) To, (vii) Subject, (vii) e-mail message body.

35. The method of claim 19 wherein the at least one telephone network includes a plurality of telephone networks and wherein each said telephone network is adapted to send a call log message to the communication platform as an SMTP message over a data network.

36. A computer readable medium containing instructions that when executed by a computer perform a method for providing a call log associated with a subscriber, comprising:
a) receiving call log data associated with at least one subscriber telephone number in at least one telephone network;
b) sending a call log message in response to said call associated with the at least one subscriber telephone number;
c) receiving said call log message at a communication platform;
d) associating said call log message with said call log associated with said subscriber;
e) providing at said communication platform said call log associated with the subscriber in response to a request; and
f) receiving said call log data wherein said call log data is in a TCAP message and includes parameters having parameter values (i) caller name (CNAM), (ii) calling telephone number, (iii) call log gateway domain name, (iv) call-log-postmaster, (v) communication platform domain name associated with the call log postmaster (vi) called telephone number (vii) communication platform domain name associated with the called telephone number; and (viii) date and time associated with the call associated with the subscriber telephone.

37. The medium of claim 36, wherein the method further comprises:
receiving call log data relating to a call associated with at least one of a plurality of subscriber telephone numbers in at least one of a plurality of telephone networks; and
sending a call log message from the at least one of a plurality of telephone networks in response to receiving said call log data associated with said at least one of subscriber telephone numbers.

38. The medium of claim 36, wherein said call log data associated with at least one subscriber telephone number relates to an inbound or outbound call associated with the at least one subscriber telephone number.

39. The medium of claim 36, the method further comprising:
mapping said call log data from a transaction capabilities application part (TCAP) message to a simple mail transfer protocol (SMTP) message.

40. The medium of claim 39, the method further comprising mapping said call log data from said TCAP message to said SMTP message.

41. The medium of claim 40, the method further comprising:
launching a query from a switch in response to said telephone call; and
sending said call log data from a service control point to said call log gateway in response to said query.

42. The medium of claim 41, the method further comprising launching said query in response to said telephone call when a preset condition is met.

43. The medium of claim 42, the method further comprising:
launching said query when said preset condition is at least one of (i) the subscriber telephone is busy; and (ii) the subscriber telephone is not answering.

44. The medium of claim 36, the method further comprising:
sending the call log message over the Internet.

45. The medium of claim 36, the method further comprising:
receiving said call log data from at least one of a public switched telephone network ("PSTN"), and a wireless telephone network.

46. The medium of claim 36, the method further comprising:
sending the call log via a data network in response to a request received via the data network.

47. The medium of claim 36, the method further comprising:
receiving call log said call log data relating to at least one of (i) an inbound call and (ii) an outbound call.

48. The medium of claim 47, the method further comprising:

receiving said call log data wherein said call log data includes at least one parameter having at least one value and wherein the at least one telephone network maps the at least one parameter to at least one asynchronous message field.

49. The medium of claim 36, the method further comprising:
mapping in said at least one telephone network maps the parameters values respectively to SMTP e-mail fields (i) From, (ii) From, (iii) From, (iv) Reply to, (v) Reply to, (vi) To (vii) To (viii) e-mail body.

50. A computer readable medium containing instructions that when executed by a computer perform a method for providing a call log associated with a subscriber, comprising:
a) receiving call log data associated with at least one subscriber telephone number in at least one telephone network;
b) sending a call log message in response to said call associated with the at least one subscriber telephone number;
c) receiving said call log message at a communication platform;
d) associating said call log message with said call log associated with said subscriber;
e) providing at said communication platform said call log associated with the subscriber in response to a request; and
f) receiving said call log data wherein said call log data is in a TCAP message and includes parameters having parameter values (i) caller name (CNAM), (ii) calling telephone number, (iii) call log gateway domain name, (iv) call-log-postmaster, (v) communication platform domain name associated with the call log postmaster (vi) called telephone number (vii) communication platform domain name associated with the called telephone number; and (viii) date and time associated with the call associated with the subscriber telephone.

51. The medium of claim 36, the method further comprising:
storing call log in a mailbox associated with the subscriber telephone.

52. The medium of claim 36, the method further comprising:
receiving call log data from a plurality of telephone networks and wherein each of said telephone networks is adapted to send a call log message to the communication platform as an SMTP message over a data network.

53. The medium of claim 50, the method further comprising:
mapping in said at least one telephone network the parameters values respectively to SMTP e-mail fields (i) From, (ii) From, (iii) Reply To, (iv) Reply To, (v) To, (vi) To, (vii) Subject, (vii) e-mail message body.

* * * * *

UNITED STATES PATENT AND TRADEMARK OFFICE
CERTIFICATE OF CORRECTION

PATENT NO. : 7,561,682 B2
APPLICATION NO. : 10/947960
DATED : July 14, 2009
INVENTOR(S) : James M. Doherty and Larry B. Pearson It is certified that error appears in the above-identified patent and that said Letters Patent is hereby corrected as shown below:

On the Title Pg. Item (73) should read:

(73) Assignee: AT&T Intellectual Property ~~I,~~ I, L.P.

Col. 16 lines 1-5
Please correct Claim 14 as follows:

14. The telephone communication system of claim 13 wherein the at least one telephone network maps the parameters values respectively to SMTP e-mail fields (i) From, (ii) From, (iii) From, (iv) Reply to, (v) Reply to, (vi) ~~To~~ To, (vii) ~~To~~ To, (viii) e-mail body.

Col. 16 lines 6-13
Please correct Claim 15 as follows:

15. The telephone communication system of claim 1 wherein the call log data is in a TCAP message and includes parameters having parameter values (i) calling telephone number, (ii) call log gateway domain name, (iii) call log postmaster, (iv) communication platform domain name, (v) calling telephone ~~number~~ number, (vi) communication platform domain name, (vii) called telephone number, (viii) date and time associated with the call associated with the subscriber.

Col. 16 lines 49-55
Please correct Claim 20 as follows:

20. The method of claim 19, receiving call log data relating to a call associated with at least one of a plurality of subscriber telephone numbers in at least one of a plurality of telephone networks; and
sending a call log message ~~form~~ from the at least one of a plurality of telephone networks in response to receiving said call log data associated with said at least one of subscriber telephone numbers.

Col. 17 lines 23-31
Please correct Claim 31 as follows:

31. The method of claim 19 wherein the call log data is in a TCAP message and includes parameters having parameter values (i) caller name (CNAM), (ii) calling telephone number, (iii) call log gateway domain name, (iv) call-log-postmaster, (v) communication platform domain name associated with the call log ~~postmaster~~ postmaster, (vi) called telephone ~~number~~ number, (vii) communication platform domain name associated with the called telephone ~~number;~~ number, and (viii) date and time associated with the call associated with the subscriber telephone.

Col. 17 lines 32-36
Please correct Claim 32 as follows:

32. The method of claim 31 wherein the at least one telephone network maps the parameters values respectively to SMTP e-mail fields (i) From, (ii) From, (iii) From, (iv) Reply to, (v) Reply to, (vi) ~~To~~ To, (vii) ~~To~~ To, (viii) e-mail body.

Col. 17 lines 37-44
Please correct Claim 33 as follows:

33. The method of claim 19 wherein the call log data is in a TCAP message and includes parameters having parameter values (i) calling telephone number, (ii) call log gateway domain name, (iii) call log postmaster, (iv) communication platform domain name, (v) calling telephone ~~number~~ number, (vi) communication platform domain name, (vii) called telephone number, (viii) date and time associated with the call associated with the subscriber.

Col. 17 lines 54-67
Please correct Claim 36 as follows:

36. A computer readable medium containing instructions that when executed by a computer perform a method for providing a call log associated with a subscriber, comprising:
 a) receiving call log data associated with at least one subscriber telephone number in at least one telephone network;
 b) sending a call log message in response to said call associated with the at least one subscriber telephone number;
 c) receiving said call log message at a communication platform;
 d) associating said call log message with said call log associated with said subscriber;
 e) providing at said communication platform said call log associated with the subscriber in response to a request; and
 f) receiving said call log data wherein said call log data is in a TCAP message and includes parameters having parameter values (i) caller name (CNAM), (ii) calling telephone number, (iii) call log gateway domain name, (iv) call-log-postmaster, (v) communication platform domain name associated with the call log ~~postmaster~~ postmaster, (vi) called telephone ~~number~~ number, (vii) communication platform domain name associated with the called telephone ~~number;~~ number, and (viii) date and time associated with the call associated with the subscriber telephone.

CERTIFICATE OF CORRECTION (continued)
U.S. Pat. No. 7,561,682 B2

Col. 19 lines 6-10
Please correct Claim 49 as follows:

49. The medium of claim 36, the method further comprising:
mapping in said at least one telephone network maps the parameters values respectively to SMTP e-mail fields (i) From, (ii) From, (iii) From, (iv) Reply to, (v) Reply to, (vi) ~~To~~ To, (vii) ~~To~~ To, (viii) e-mail body.

Col. 19 lines 11-25 & Col. 20 lines 1-5
Please correct Claim 50 as follows:

50. A computer readable medium containing instructions that when executed by a computer perform a method for providing a call log associated with a subscriber, comprising:
　a) receiving call log data associated with at least one subscriber telephone number in at least one telephone network;
　b) sending a call log message in response to said call associated with the at least one subscriber telephone number;
　c) receiving said call log message at a communication platform;
　d) associating said call log message with said call log associated with said subscriber;
　e) providing at said communication platform said call log associated with the subscriber in response to a request; and
　f) receiving said call log data wherein said call log data is in a TCAP message and includes parameters having parameter values (i) caller name (CNAM), (ii) calling telephone number, (iii) call log gateway domain name, (iv) call-log-postmaster, (v) communication platform domain name associated with the call log ~~postmaster~~ postmaster, (vi) called telephone ~~number~~ number, (vii) communication platform domain name associated with the called telephone ~~number;~~ number, and (viii) date and time associated with the call associated with the subscriber telephone.

Signed and Sealed this

Nineteenth Day of January, 2010

David J. Kappos
*Director of the United States Patent and Trademark Office*